(12) United States Patent
Bayer et al.

(10) Patent No.: US 11,117,610 B2
(45) Date of Patent: Sep. 14, 2021

(54) STEERING COLUMN FOR A MOTOR VEHICLE

(71) Applicants: thyssenkrupp Presta AG, Eschen (LI); thyssenkrupp AG, Essen (DE)

(72) Inventors: Tim Bayer, Grabs (CH); Sebastian Huber, Göfis (AT); Daniel Kreutz, Feldkirch (AT); Arne Schacht, Feldkirch (AT)

(73) Assignees: THYSSENKRUPP PRESTA AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/764,443

(22) PCT Filed: Nov. 21, 2018

(86) PCT No.: PCT/EP2018/082039
§ 371 (c)(1),
(2) Date: May 15, 2020

(87) PCT Pub. No.: WO2019/101781
PCT Pub. Date: May 31, 2019

(65) Prior Publication Data
US 2020/0331513 A1 Oct. 22, 2020

(30) Foreign Application Priority Data
Nov. 23, 2017 (DE) ..................... 10 2017 221 004.4

(51) Int. Cl.
*B62D 1/181* (2006.01)
*B62D 1/185* (2006.01)
(Continued)

(52) U.S. Cl.
CPC ............. *B62D 1/181* (2013.01); *B62D 1/185* (2013.01); *F16C 3/035* (2013.01); *F16C 33/585* (2013.01); *F16C 2326/24* (2013.01)

(58) Field of Classification Search
CPC ......... B62D 1/181; B62D 1/185; F16C 3/035; F16C 33/585; F16C 2326/24; F16C 2240/50; F16C 33/36
See application file for complete search history.

(56) References Cited

U.S. PATENT DOCUMENTS 4,805,478 A 2/1989 Beauch
4,867,003 A * 9/1989 Beauch .................. B62D 1/192
74/492

(Continued)

FOREIGN PATENT DOCUMENTS

DE 10 2009 008 009 A 8/2010
DE 10 2015 216 326 A 6/2016
(Continued)

OTHER PUBLICATIONS

English Translation of International Search Report issued in PCT/EP2018/082039, dated Feb. 21, 2019.

*Primary Examiner* — Darlene P Condra
(74) *Attorney, Agent, or Firm* — thyssenkrupp North America, LLC (57) ABSTRACT

A steering column is disclosed for a motor vehicle, including an actuating unit, in which a steering spindle is rotatably mounted about a longitudinal axis. The actuating unit includes a casing unit which has at least three casing tubes which are arranged so as to be axially telescopable relative to one another. One of the casing tubes forms an outer casing tube in which at least one intermediate casing tube, in which an inner casing tube is accommodated, is accommodated. Rolling bodies are arranged between the casing tubes such that they are able to roll in the axial direction. First rolling (Continued)

bodies are arranged between the outer casing tube and the intermediate casing tube, and second rolling bodies are arranged between the intermediate casing tube and the inner casing tube, the first rolling bodies being arranged offset in the circumferential direction relative to the second rolling bodies.

11 Claims, 5 Drawing Sheets

(51) Int. Cl.
    *F16C 3/035*      (2006.01)
    *F16C 33/58*      (2006.01)

(56) References Cited

U.S. PATENT DOCUMENTS

| | | | |
|---|---|---|---|
| 6,729,648 B2 * | 5/2004 | Ulintz | B62D 1/192 |
| | | | 280/777 |
| 2003/0006600 A1 * | 1/2003 | Schwarzbich | F16D 3/06 |
| | | | 280/775 |
| 2005/0022623 A1 | 2/2005 | Reiche | |
| 2017/0328400 A1 * | 11/2017 | Muntener | B21D 53/10 |

FOREIGN PATENT DOCUMENTS

| | | |
|---|---|---|
| EP | 1 375 295 A | 1/2004 |
| WO | 2010088987 A | 8/2010 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2018/082039, filed Nov. 21, 2018, which claims priority to German Patent Application No. DE 10 2017 221 004.4, filed Nov. 23, 2017, the entire contents of both of which are incorporated herein by reference.

FIELD

The present disclosure generally relates to a steering column for a motor vehicle.

BACKGROUND

A steering column for a motor vehicle comprises a steering shaft having a steering spindle, a steering wheel for the introduction of a steering command by the driver being attached at that end of said spindle which is at the rear in the direction of travel and which faces toward the driver. The steering spindle is rotatably mounted in the casing unit of an actuating unit, which is mounted on the vehicle body by way of a carrying unit which holds the casing unit. Adjustable steering columns make it possible to adjust the actuating unit relative to the vehicle body.

It is known practice to design the steering column such that it can be adjusted in the longitudinal direction, that is to say in the axial direction of the steering spindle, in order to, during manual driving operation, adapt the steering wheel in terms of operating position to the driver position for a comfortable steering intervention and to, during autonomous driving operation, when no manual steering intervention takes place, longitudinally telescope the steering column and as a result bring the steering wheel into a stowage position outside of the operating position, such that the vehicle interior is freed for some other use.

The adjustability in the longitudinal direction is realized by a telescope-like arrangement of casing tubes. To achieve a sufficient adjustment travel in the case of a stowage position with short dimensions which are as compact as possible, it is known from DE 10 2015 216326 A1 to arrange at least three casing tubes such that they can be displaced in a telescope-like manner in one another, namely an outer casing tube, an inner casing tube, and also at least one intermediate casing tube which is inserted coaxially therebetween. To set the stowage position, the three casing tubes can be telescoped, that is to say retracted, to such an extent that the inner casing tube and the intermediate casing tube or tubes are sunk, in the axial direction, substantially in the outer casing tube. The retraction and extension operations are preferably effected by means of a motorized adjustment drive, which for example comprises a spindle drive which can be driven by an electric motor and which engages on the casing tubes.

In order to retract the steering column rapidly and reliably into the stowage position, and to extend the steering wheel from the stowage position into the operating position when changing from automatic to manual driving operation, it is essential for the casing tubes to be able to be moved easily relative to one another, that is to say to slide with sufficiently low friction, such that, for the purposes of retraction and extension, they can be moved rapidly and reliably by the adjustment drive with a small drive force. In this case, the casing tubes have to be guided in one another with as little play as possible, so that a sufficient stiffness of the steering column is ensured. In order to achieve this, the aforementioned DE 10 2015 216326 A1 already proposes providing a rolling-bearing-mounted linear guide between the casing tubes. In the case of a linear rolling bearing arrangement of this kind, a low-friction telescoping movement is achieved by way of rolling bodies which are mounted, between the casing tubes, such that they are able to roll in the longitudinal direction. As a result, an easy adjustability with little play is achieved, which in particular has fewer stick-slip phenomena than a mechanically comparable plain bearing arrangement.

In the case of the generic steering column, for the guidance of the at least three casing tubes which are guided in one another, at least two linear rolling bearing arrangements are required, between the outer casing tube and the intermediate casing tube and between the intermediate casing tube and the inner casing tube. As a result of the rolling bodies which are arranged between the casing tubes, the rolling bearing arrangements require more radial installation space than, for example, simple sliding guides. However, in view of the limited amount of available installation space in the motor vehicle, increasing the dimensions of the steering column is not acceptable.

Thus a need exists for a steering column having a compact rolling-bearing-mounted casing unit.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, comprising an actuating unit, in which a steering spindle is mounted so as to be able to rotate about a longitudinal axis and which comprises a casing unit which comprises at least three casing tubes which are arranged so as to be axially telescopable relative to one another and one of which forms an outer casing tube in which at least one intermediate casing tube, in which an inner casing tube is accommodated, is accommodated, and rolling bodies being arranged, between the casing tubes, such that they are able to roll in the axial direction.

According to the invention, for a generic steering column mentioned in the introduction, it is proposed that first rolling bodies are arranged between the outer casing tube and the intermediate casing tube, and second rolling bodies are arranged between the intermediate casing tube and the inner casing tube, the first rolling bodies being arranged offset in the circumferential direction relative to the second rolling bodies.

In the arrangement according to the invention, the rolling bodies of the rolling-bearing-mounted linear guides, which are located in the coaxially arranged first and second interspaces between different pairs of casing tubes, for example between the inner casing tube and the intermediate casing tube, or between the intermediate casing tube and the outer casing tube, or else between two intermediate casing tubes, are positioned at first and second circumferential positions, which are spaced apart from one another so as to be distributed over the circumference. Expressed differently, the rolling bodies in different radially inner and outer interspaces are in each case positioned in alternating, mutually angularly offset radial directions which correspond to the respective circumferential positions, that is to say the radial directions intersect the casing tubes at the relevant circumferential positions.

As a result, first and second rolling bodies are prevented from being positioned adjacently in the same radial direction with respect to a casing tube and, according to the invention, are thus not arranged above one another on the same circumferential position, as seen in the radial direction from the inside toward the outside. The alternating positioning in the circumferential direction results in the advantage that the first and second rolling bodies between the casing tubes take up less installation space in the radial direction, and a compact construction of the steering column can be realized, which, for its part, takes up little installation space in the vehicle. A further advantage is that the offset arrangement of the rolling bodies forms a spatially determined, optimized bearing arrangement of the casing tubes, which brings about a high degree of stiffness of the casing unit and avoids undesirable vibrations. Mutual functional impairment of the rolling-bearing-mounted linear guides even under extreme operating conditions, for example load peaks caused by a vehicle collision, is also largely prevented by the offset arrangement, as a result of which the functional reliability, and thus the vehicle safety, is increased.

Preferably, the first rolling bodies are arranged in one or more axially parallel first rows and the second rolling bodies are arranged in one or more axially parallel second rows. In each case, for the purposes of forming a linear guide, two or more rolling bodies of a row are arranged, between the casing tubes, such that they are able to roll in the longitudinal direction, as is known in principle from rolling-bearing-mounted linear bearing arrangements. According to the invention, the first and second rows, which correspond to the first and second linear guides, are offset with respect to one another in the circumferential direction.

The rolling bodies can be offset relative to one another in the axial direction, that is to say in the direction of the longitudinal axis, in different rows, for example in a first and second row, or else in two different first or second rows, and alternatively or additionally have different spacings with respect to one another within a row. As a result, the vibration behavior and the stiffness of the casing tube arrangement can be adapted and improved, for example for suppressing undesired resonances or for increasing the natural frequency.

Provision can preferably be made for the first rolling bodies to be accommodated in a first rolling body cage and for the second rolling bodies to be accommodated in a second rolling body cage, in each case such that they are able to rotate about their rolling axes. The first and second rolling body cages can be of identical construction and merely of different dimensioning. A rolling body cage has a tube-portion-shaped or sleeve-shaped basic form and is inserted coaxially into the interspace between two casing tubes. In the rolling body cage, the rolling bodies are preferably held in position relative to one another in a loose form fit, a respective rolling body preferably being held about the rolling axis thereof in a rolling body receptacle, such that it can roll on the adjoining casing tubes. By way of example, the first and second rolling body receptacles in the first and second rolling body cages can be arranged in axially parallel rows, as a result of which the spacings between the rolling bodies are defined in the axial direction. A corresponding rotational orientation of the rolling body cages about the longitudinal axis makes it possible to predefine the angular position, and accordingly the offset according to the invention, of the rolling bodies in the circumferential direction, for example an offset arrangement of the rows of first and second rolling bodies. Within a rolling body cage, the rolling body positions in different rows can be offset with respect to one another in the axial direction as required.

A rolling body cage can be formed in one part or else in multiple parts from sheet metal or from plastic, with a one-piece configuration as a plastics injection-molded part for receiving all of the rolling bodies being able to be manufactured efficiently, and being lightweight and functionally reliable in the process.

An advantageous development is that a rolling body cage is at least partially of slotted configuration in the axial direction. A longitudinal slot which extends at least over a part of the length in the axial direction, or passes through the entire length in the axial direction, provides the rolling body cage with a circumferentially open, C-shaped cross-sectional profile. If manufactured from an elastic material, for example from a suitable plastic, such as polypropylene (PP), acrylonitrile butadiene styrene (ABS), polyamide (PA) or the like, the rolling body cage can be deformed elastically in the region of the longitudinal slot and can be positioned in a radially resiliently preloaded manner on or in a casing tube. The assembly can be simplified as a result.

The casing tubes can comprise raceways for the rolling bodies, said raceways extending in the axial direction. The raceways, synonymously referred to as rolling body raceways, are configured on the circumference of the casing tubes and in each case lie radially opposite one another in pairs in order to form a linear guide. A linear guide comprises at least one outer raceway, which is configured on the outer circumference of an inner casing tube, and an inner raceway, which is configured on the inner circumference of an outer casing tube of the aforementioned outer raceway such that it lies radially opposite thereto, with one or more rolling bodies being inserted with little play, substantially without play, between the raceways, such that they are able to roll in the axial direction. Preferably, a plurality of raceways are configured so as to be distributed over the circumference, preferably uniformly distributed. As a result, first and second linear guides are formed which, correspondingly to the arrangement of the rolling bodies according to the invention, are offset with respect to one another in the circumferential direction.

An advantageous embodiment of the invention is that at least one of the raceways and/or the rolling bodies are/is of cambered configuration. A cambered raceway has a cross section which is convexly curved in the radial direction in relation to a cylindrical basic form; a cambered rolling body is formed by a barrel-shaped roller which is convexly curved in relation to a cylindrical basic form, the diameter being larger in the middle region than in the end regions. The rolling bodies, and/or at least one of the raceways, can be cambered. While a cylindrical rolling body, for example a cylindrical needle roller, in an arrangement according to the invention on a cylindrical raceway, has a linear support which lies transversely with respect to the axial direction and which is continuous over the rolling body, in the case of a cambering, a short, linear, virtually punctiform support is formed between a rolling body and at least one of the raceways.

Compared with a ball bearing, which, as rolling bodies, has balls which roll on planar or convexly groove-shaped ball raceways, in the cambered embodiment of a roller bearing or needle roller bearing it is possible for any desired size of radius to be predefined by the cambering, and, unlike in the case of balls, specifically independently of the rolling body diameter which is tightly delimited by the interspace between the casing tubes. As a result, it is more easily possible to set the rolling bearing in a play-free manner, without the risk of a notch effect, such as when using balls with a comparably small diameter. Consequently, it is possible to realize an improved, low-play setting of the longitudinal guidance of the casing tubes, with compact dimensions.

Provision can be made for the casing tubes to have a polygonal cross section, preferably with an even number of sides, the first and second rolling bodies preferably being arranged on sides which in each case lie opposite one another in pairs. The casing tubes can be configured as multi-edged tubes, for example as tube profiles with four, six or eight sides, the raceways for the rolling bodies being able to be configured on one or more of the side surfaces, on the inside or on the outside. The arrangement which is offset in the circumferential direction according to the invention is realized in that the first rolling bodies roll on first side surfaces, and the second rolling bodies roll on side surfaces of the cross section which are offset with respect thereto. By way of example, in the case of an eight-sided cross section, the first rolling bodies which are arranged between the outer casing tube and the intermediate casing tube can be arranged, counted in the circumferential direction, on the even-numbered sides, that is to say the second, fourth, sixth and eighth sides, and the second rolling bodies which are arranged between the intermediate casing tube and the inner casing tube can be arranged, counted in the circumferential direction, on the odd-numbered sides, that is to say the first, third, fifth and seventh sides. In the octagonal arrangement, the radial directions in which the rolling bodies are positioned are in each case angularly offset in relation to one another by 360°/8=45°; correspondingly, a 90° angular offset could be predefined in the case of a rectangular arrangement and a 60° angular offset could be predefined in the case of a hexagonal arrangement. The paired arrangement, which is possible in particular with an even number of sides, makes it possible to achieve a uniform distribution of bearing loads on the circumference.

It is likewise conceivable and possible for at least two intermediate casing tubes which are axially telescopable in one another to be provided, between which tubes third rolling bodies are arranged, which are arranged offset relative to the first rolling bodies and/or second rolling bodies. Additionally, further intermediate casing tubes can be arranged between the outer casing tube and the inner casing tube of the previously described, triply telescopable casing unit, such that a quadruply or multiply telescopable arrangement is formed. In this case, the offset in the circumferential direction according to the invention achieves the situation whereby the rolling bodies which are arranged between the intermediate casing tubes are arranged in each case offset at a spacing with respect to the coaxially adjacent casing tubes, such that none of the intermediate casing tubes is rolling-body-mounted on the inside and on the outside at the same circumferential position. As a result, the described advantages can be realized throughout.

Preferably, a motorized adjustment drive can be connected to the inner casing tube and the outer casing tube, by way of which drive the inner casing tube can be axially retracted and extended relative to the outer casing tube. The adjustment drive can comprise a spindle drive, having a spindle nut which is arranged on a threaded spindle, and a motorized drive, by way of which the threaded spindle and the spindle nut can be driven in a rotating manner relative to one another. Adjustment drives of this kind are known in principle in the prior art and are considered to be reliable and robust. In this case, the spindle nut is attached in a non-displaceable manner to the one casing tube, the inner or outer casing tube, in the direction of the longitudinal axis (axial direction), and the threaded spindle is attached to the other casing tube, the outer or inner casing tube, which is telescopable with respect thereto. The spindle nut or the threaded spindle is driven in a rotating manner by an electric actuating motor by way of a suitable mechanism, for example a worm or belt mechanism, as a result of which the threaded spindle or spindle nut which is rotationally fixed relative thereto is moved in translation in the direction of the spindle longitudinal axis, and, depending on the relative direction of rotation, the inner casing tube retracts or extends in the axial direction relative to the outer casing tube.

The actuating unit can be held in a carrying unit which can be connected to a vehicle body. Provision can be made for the actuating unit to be mounted on the carrying unit such that it can be pivoted in terms of height about a pivot axis which lies transversely with respect to the longitudinal axis. As a result of the pivoting about such a horizontal pivot axis, a height adjustment can be realized, in the case of which the steering wheel which is attached at the rear end of the steering spindle can be adjusted in terms of height relative to the driver position.

The height adjustment can be performed manually. Particularly for the automated stowage of the steering column during autonomous driving, it is advantageous for an electric height adjustment drive to be connected to the carrying unit and the actuating unit, by way of which drive the actuating unit can be moved relative to the carrying unit about the pivot axis. The height adjustment drive is likewise known per se and can for example be realized in the form of an electromotively driven spindle drive, as described previously for the longitudinal adjustment.

It is possible for the steering spindle to be coupled to a feedback actuator. In the case of a mechanically non-coupled steer-by-wire steering system, a feedback actuator is used for the purpose of giving the driver haptic feedback, depending on the driving situation, by way of the steering wheel in order to relay a steering feel, similar to in the case of conventional mechanically coupled steering arrangements. For this purpose, a feedback actuator comprises an actuator unit which comprises an adjustment drive which is used as a manual torque or steering wheel adjuster, and which couples a restoring torque (feedback torque), which corresponds to the actual reaction torque, into the steering wheel by way of the steering shaft, depending on a feedback signal. Such "force-feedback" systems provide the driver with the impression of a real driving situation, as in the case of a conventional steering arrangement, which facilitates an intuitive reaction.

Furthermore, a steering column for a motor vehicle is proposed, comprising an actuating unit, in which a steering spindle is mounted so as to be able to rotate about a longitudinal axis and which comprises a casing unit which comprises at least two casing tubes which are arranged so as to be axially telescopable relative to one another, rolling bodies being arranged, between the casing tubes, such that they are able to roll in the direction of the longitudinal axis, the casing tubes comprising raceways for the rolling bodies, said raceways extending in the direction of the longitudinal axis. According to the invention, at least one of the raceways and/or the rolling bodies are/is of cambered configuration.

A cambered raceway has a cross section which is convexly curved in the radial direction in relation to a cylindrical basic form; a cambered rolling body is formed by a barrel-shaped roller which is convexly curved in relation to a cylindrical basic form, the diameter being larger in the middle region than in the end regions. The rolling bodies, and/or at least one of the raceways, can be cambered. While a cylindrical rolling body, for example a cylindrical needle roller, in an arrangement according to the invention on a planar raceway, has a linear support which lies transversely with respect to the direction of the longitudinal axis and which is continuous over the rolling body, in the case of a cambering, a short, linear, virtually punctiform support is formed between a rolling body and at least one of the raceways. Compared with a ball bearing, which, as rolling bodies, has balls which roll on planar or convexly groove-shaped ball raceways, in the cambered embodiment of a roller bearing or needle roller bearing it is possible for any desired size of radius to be predefined by the cambering, and, unlike in the case of balls, specifically independently of the rolling body diameter which is tightly delimited by the interspace between the casing tubes. As a result, it is more easily possible to set the rolling bearing in a play-free manner, without the risk of a notch effect, such as when using balls with a comparably small diameter. Consequently, it is possible to realize an improved, low-play setting of the longitudinal guidance of the casing tubes, with compact dimensions.

Figure 1:
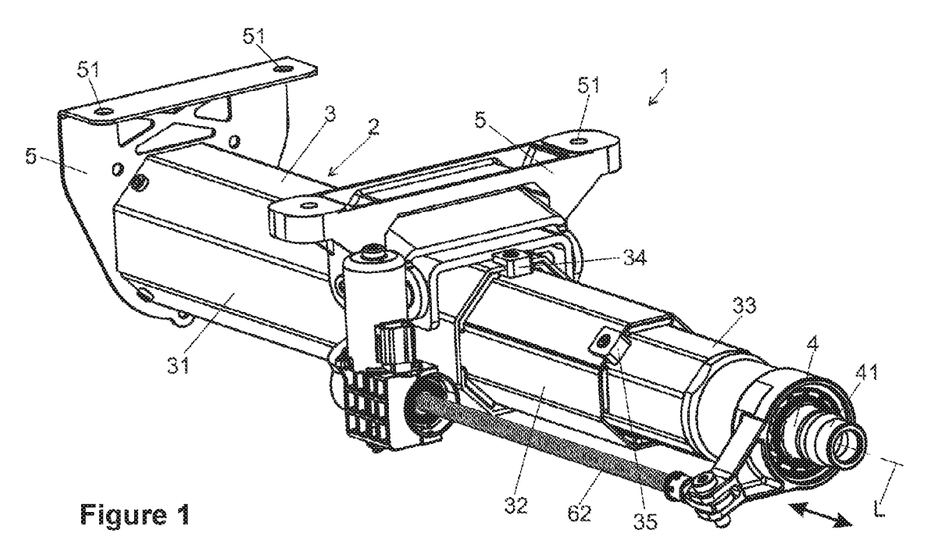
FIG. 1 is a schematic perspective view of a steering column.

FIG. 1 shows a view, obliquely from the rear with respect to the direction of travel, of a steering column 1 according to the invention which comprises an actuating unit 2. The actuating unit 2 comprises a casing unit 3 which comprises an outer casing tube 31, an intermediate casing tube 32 and an inner casing tube 33. The casing tubes 31, 32 and 33 are arranged coaxially in one another such that they can be displaced in a telescoping manner in the direction of a longitudinal axis L, as indicated with a double-headed arrow.

A steering spindle 4, which, at the rear end thereof, comprises a connection portion 41 for the attachment of a steering wheel (not illustrated), is mounted in the casing unit 3 such that it is able to rotate about the longitudinal axis L.

The actuating unit 3 is held in a carrying unit 5 which comprises fastening means 51 for attachment to a vehicle body (not illustrated).

An adjustment drive 6 comprises a spindle drive having a spindle nut 61 and a threaded spindle 62 screwed therein, which can be driven in a rotating manner relative to one another by an electric motor 63. The threaded spindle 62 extends parallel to the longitudinal axis L and is connected to the inner casing tube 33, and the spindle nut 61 is supported in the longitudinal direction, which corresponds to the axial direction of the longitudinal axis L, on the outer casing tube 31. As a result of a relative rotation by means of the motor 63, the threaded spindle 62 and the spindle nut 61 are moved together or apart from one another, depending on the direction of rotation, as a result of which the inner casing tube 33 is retracted or extended, in the axial direction, into or out of the outer casing tube 31, as indicated with the double-headed arrow. As a result, longitudinal adjustment is realized, by way of which a steering wheel which is attached to the connection portion 41 can be brought, toward the front, into a stowage position in which the inner casing tube 33 and the intermediate casing tube 32 are retracted, that is to say sunk toward the front, in the outer casing tube 31.

As an alternative, the spindle nut 61 can be supported on the inner casing tube 33, and the threaded spindle 62 can be supported on the outer casing tube 31.

Figure 2:
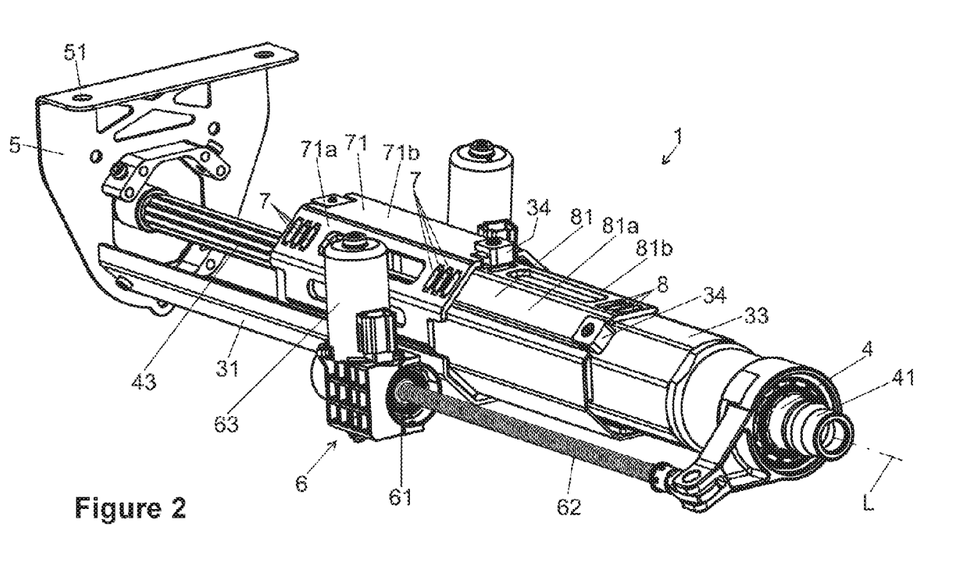
FIG. 2 is a schematic partial interior view of the steering column according to FIG. 1.

In FIG. 2, the outer casing tube 31 and the intermediate casing tube 32 have been cut open and thus partially omitted, such that first rollers 7, which form first rolling bodies and are accommodated in a first roller cage 71 such that they are able to rotate about their roller axis, and second rollers 8, which form second rolling bodies and are accommodated in a second roller cage 81 such that they are able to rotate loosely about their roller axis, are visible. The arrangement of the rollers 7 and 8, and also of the roller cages 71 and 81, is explained in detail in FIGS. 3 to 11 below.

Figure 6:
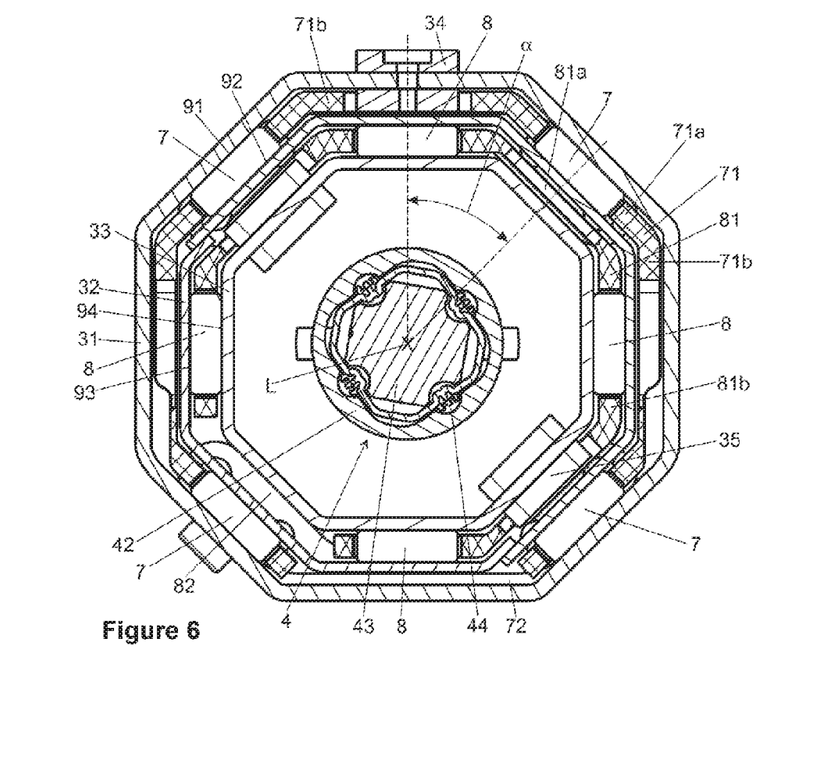
FIG. 6 is a cross-sectional view through the steering column according to FIGS. 1-5.

The casing tubes 31, 32 and 33 and the roller cages 71 and 81 have an octagonal profile cross section, as can be seen in FIG. 6 which shows a cross section through the casing unit 3 in the retracted state, in which the inner casing tube 33 and the intermediate casing tube 32 are retracted into the outer casing tube 31. It can be discerned therefrom that the first rollers 7 are arranged between the outer casing tube 31 and the intermediate casing tube 32, and the second rollers 8 are arranged between the intermediate casing tube 32 and the inner casing tube 33. In this case, the rollers 7 and 8 are able to roll, about their roller axes which lie transversely with respect to the longitudinal axis, in the axial direction of the longitudinal axis L on raceways 91, 92, 93, 94 which are configured on the casing tubes 31, 32 and 33.

Figure 7:
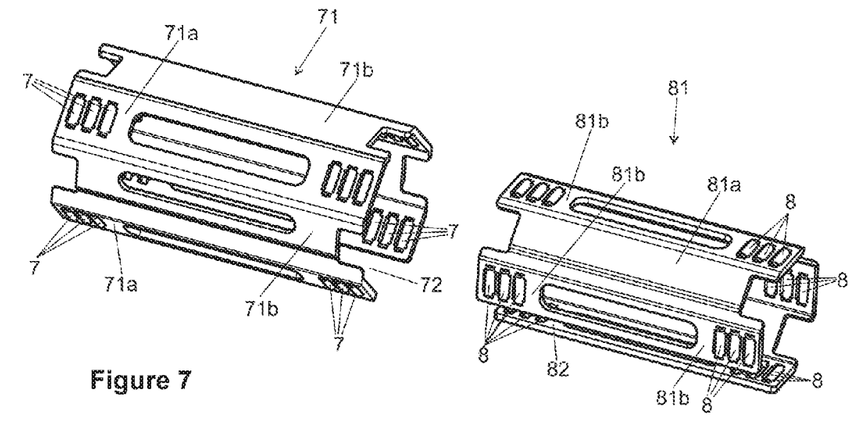
FIG. 7 is a schematic perspective view of rolling body cages of the steering column according to FIG. 1.

The roller cages 71 and 81 are of tube portion sleeve-shaped configuration and, like the casing tubes 31, 32 and 33, have an octagonal cross section, as can be seen in the separated view of FIG. 7. The roller cage 71 is arranged coaxially between the outer casing tube 31 and the intermediate casing tube 32, and the roller cage 81 is arranged coaxially between the intermediate casing tube 32 and the inner casing tube 33.

The first rollers 7 are arranged in the roller cage 71 in each case in rows of six on those sides 71a of the octagonal profile between which sides 71*b* without rollers are in each case located in the circumferential direction. The second rollers 8 are arranged in the roller cage 81 in each case in rows of six on those sides 81*b* of the octagonal profile between which sides 81*a* without rollers are in each case located in the circumferential direction. The roller cages 71 and 81 are oriented such that, in cross section, in each case the sides 71*a* and 81*a*, and the sides 71*b* and 81*b*, lie radially above one another in adjacently parallel fashion. As a result, the rollers 7 and 8 are arranged offset relative to one another in the circumferential direction, and specifically offset in each case by an eighth of the circumference in the octagonal cross section which is illustrated. The linear guides, which are each formed by a row of rollers 7 and 8, respectively, are arranged at a spacing with respect to the longitudinal axis L over the circumference, here at an angular offset a of 360°/8=45°, as can be seen in FIG. 6.

Figure 3:
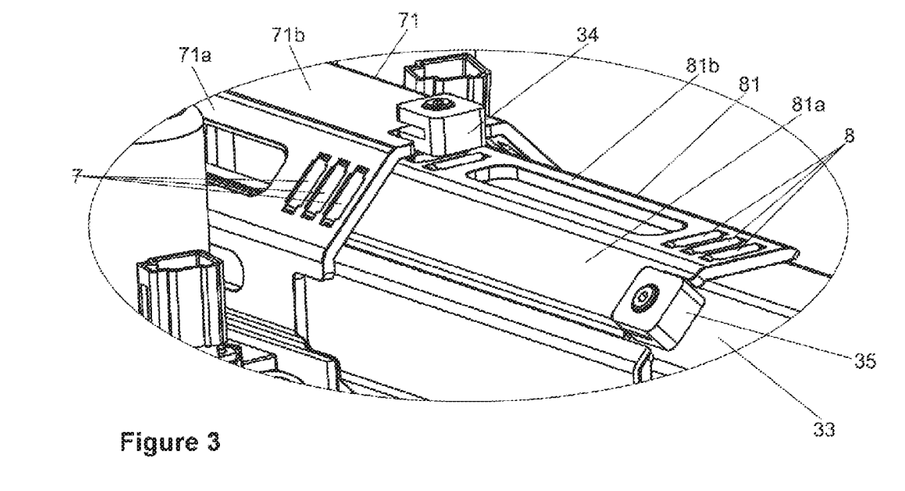
FIG. 3 is an enlarged detail view of FIG. 2.

The roller cages 71 and 81 each comprise a slot 72 and 82, respectively, which is continuous in the longitudinal direction, as can be seen in FIGS. 3 and 7. The slots 72 and 82, just like the linear guides, are offset relative to one another in the circumferential direction, by an eighth of the circumference in the example which is shown. However, it is also conceivable and possible to configure the roller cages 71 and 81 without a slot and thus with a closed cross-sectional profile.

The arrangement of the linear guides which are formed by the rows of the rollers 7, together with the raceways 91 and 92, and the rollers 8, together with the raceways 93 and 94, said arrangement being offset in the circumferential direction according to the invention, can likewise be seen in the perspective view of FIG. 3.

Figure 4:
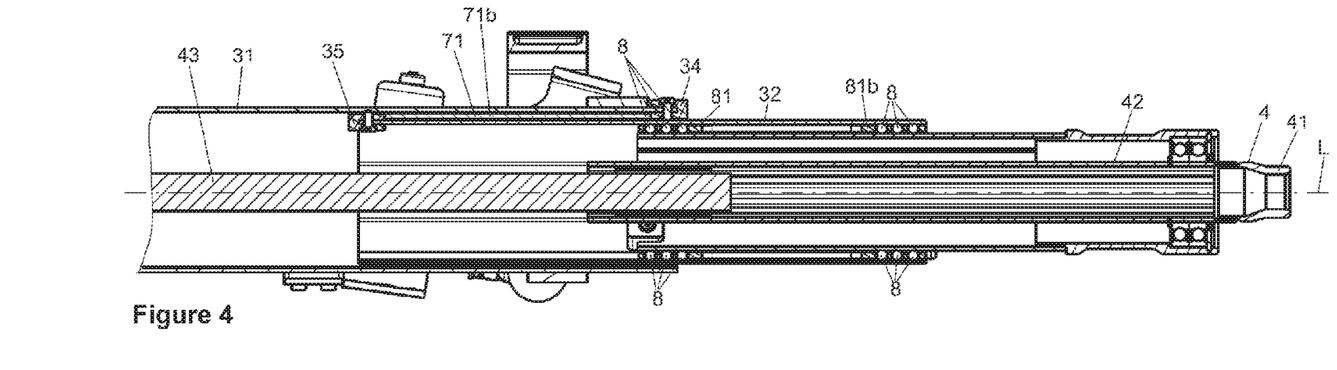
FIG. 4 is a longitudinal section (along the longitudinal axis) through the steering column according to FIG. 1.
Figure 5:
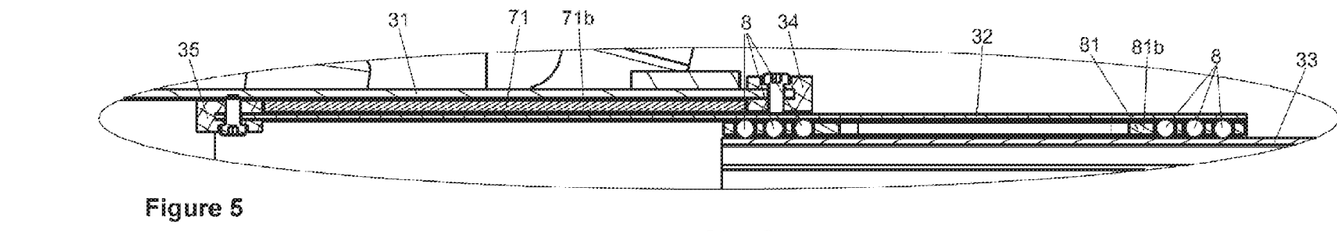
FIG. 5 is an enlarged detail view of FIG. 3.

From the longitudinal section of FIG. 4 and the enlarged view thereof of FIG. 5, which show a sectional view A-A according to FIG. 6, it emerges that, in that circumferential region in which the rollers 8 are arranged between the intermediate casing tube 32 and the inner casing tube 33, there are no rollers between the outer casing tube 31 and the intermediate casing tube 32, but rather merely the wall of that side 71*b* of the roller cage 7 which bears no rollers. As a result, a space-saving arrangement is realized, which also makes improved vibration behavior and a relatively high stiffness of the casing unit 3 possible.

FIGS. 8, 9, 10 and 11 each illustrate an enlarged cross section through one of the linear guides in different embodiments of the rollers 7 and 8, respectively, between the raceways 91 and 92, and 93 and 94, respectively, with only a first roller 7 and first raceways 91 and 92 being indicated merely for the sake of clarity, which can, however, equally be applied to an embodiment and arrangement of second rollers 8 between second raceways 93 and 94.

Figure 8:
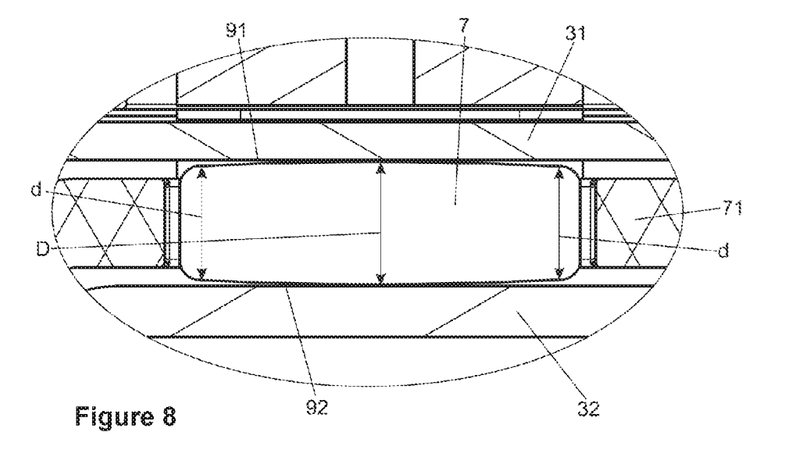
FIG. 8 is an enlarged detail view of FIG. 6 in a first embodiment.

In the example of FIG. 8, the raceways 91 and 92 are of planar configuration and extend in an axially parallel tangential plane, and the roller 7 is of cambered configuration. Said cambered roller 7 has a barrel-shaped convexity and has, in the middle region thereof, a diameter D which is larger than the diameter d at the end regions. As a result, the roller 7 contacts the middle of the raceways 91 and 92 in a short, linear, virtually punctiform contact area.

Figure 9:
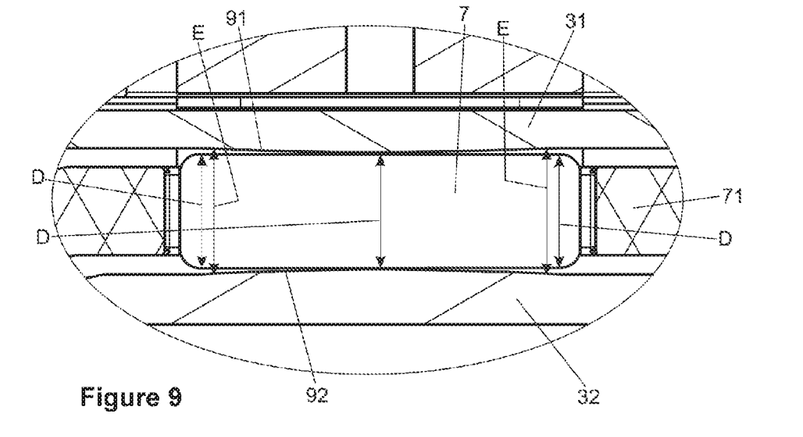
FIG. 9 is an enlarged detail view of FIG. 6 in a second embodiment.

In the example of FIG. 9, the roller 7 is of cylindrical configuration with a same continuous diameter D, and the raceways 91 and 92 are both of cambered configuration. The cambered raceway 91 is curved convexly toward the inside in an arcuate manner, and the raceway 92 is curved convexly toward the outside in an arcuate manner, such that the raceways 91 and 92 have a spacing D in the middle circumferential region and only contact the roller 7 there, and, on the outside, in the end regions of the roller 7, have a larger spacing E, such that the roller 7 is not contacted there. As a result, a relatively small contact area is produced as compared with the embodiment of FIG. 7.

Figure 10:
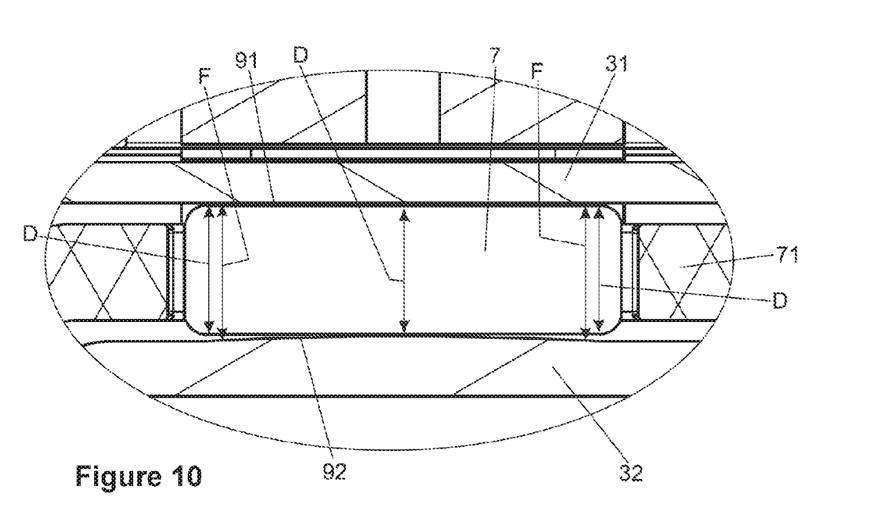
FIG. 10 is an enlarged detail view of FIG. 6 in a third embodiment.

In the embodiment which is shown in FIG. 10, the roller 7, as in FIG. 9, is of cylindrical configuration with the same continuous diameter D. However, in contrast to FIG. 9, the outer raceway 91 is of planar configuration, and only the inner raceway 92 is cambered. In the middle region, the raceways have the spacing D; on the outside, a larger spacing F relative thereto. As a result, the roller 7 lies against the raceway 91 with a linear contact surface, and lies against the inner raceway 92 in a short, linear, virtually punctiform support.

Figure 11:
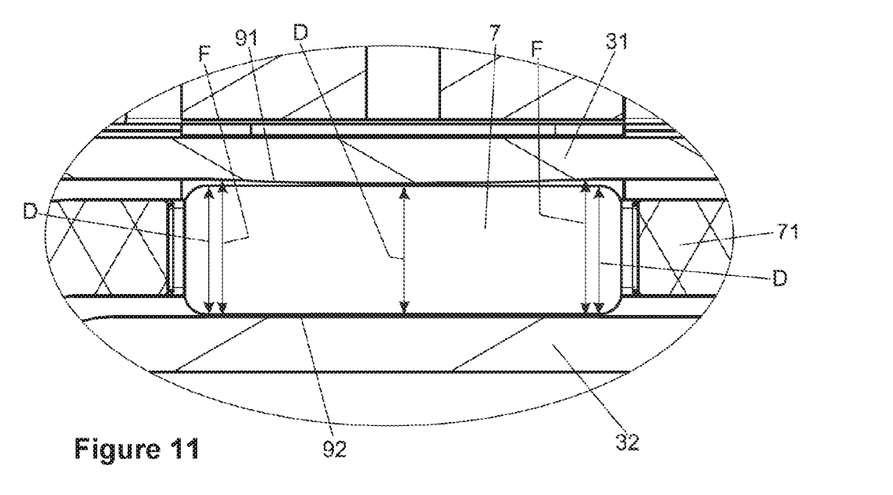
FIG. 11 is an enlarged detail view of FIG. 6 in a fourth embodiment.

The embodiment according to FIG. 11 is similar to the embodiment according to FIG. 10, with the difference that, in this case, the inner raceway 92 is planar, and the outer raceway 91 is cambered, as in the embodiment according to FIG. 9.

In addition, it is possible for the cambered embodiment of the roller 7, as shown in FIG. 8, to be combined with cambered raceways 91 and/or 92.

Correspondingly, the roller 8 can be cambered or cylindrical, and/or the raceways 93 and/or 94 can be cambered or cylindrical.

A stop 34 can be attached to the outer casing tube 31, said stop protruding, at the open end, inwardly into the interspace between the outer casing tube 31 and the intermediate casing tube 32. When being moved out, the roller cage 71 strikes against the stop 34 in the axial direction and is secured against separation from the outer casing tube 31. A stop 35 which protrudes outwardly into the interspace between the outer casing tube 31 and the intermediate casing tube 32 can be attached at the inner end of the intermediate casing tube 32, said stop preventing the roller cage 71 from detaching from the intermediate casing tube 32 in the axial direction, and likewise securing the intermediate casing tube 32 against being pulled out of the outer casing tube 31.

The steering spindle 4 is likewise of telescopable configuration, having an inner shaft 43 which engages in a form-fitting manner into an outer shaft 42 and which can be telescoped in the longitudinal direction, with rolling bodies 44 being able to be inserted therebetween in order to form a smooth-running, rolling-bearing-mounted linear bearing arrangement. As an alternative, a sliding guide can be provided between the inner shaft 43 and the outer shaft 42.

LIST OF REFERENCE SIGNS

1 Steering column
2 Actuating unit
3 Casing unit
31 Outer casing tube
32 Intermediate casing tube
33 Inner casing tube
34, 35 Stop
4 Steering spindle
41 Connection portion
42 Outer shaft
43 Inner shaft
44 Rolling body
5 Carrying unit
51 Fastening means
6 Adjustment drive
61 Spindle nut
62 Threaded spindle
63 Motor 7,8 Rollers
71, 81 Roller cages
71a Side (with rollers)
71b Side (without rollers)
81a Side (without rollers)
81b Side (with rollers)
72, 82 Slot
91, 92, 93, 94 Raceway
L Longitudinal axis
D, d Diameter (roller)
E, F Spacing

What is claimed is:

1. A steering column for a motor vehicle, comprising:
a steering spindle;
an actuating unit, in which the steering spindle is mounted so as to be able to rotate about a longitudinal axis, the actuating unit comprising:
a casing unit which comprises three casing tubes arranged to axially telescope relative to one another, the casing tubes comprising an outer casing tube in which an intermediate casing tube of the three casing tubes is disposed, and an inner casing tube disposed within the intermediate casing tube, and
rolling bodies disposed between the casing tubes, such that the rolling bodies roll in the axial direction,
wherein first rolling bodies of the rolling bodies are arranged between the outer casing tube and the intermediate casing tube, and second rolling bodies of the rolling bodies are arranged between the intermediate casing tube and the inner casing tube, the first rolling bodies being arranged offset in the circumferential direction relative to the second rolling bodies.

2. The steering column of claim 1 wherein the first rolling bodies are arranged in one or more axially parallel first rows and the second rolling bodies are arranged in one or more axially parallel second rows.

3. The steering column of claim 1 wherein the first rolling bodies are accommodated in a first rolling body cage and the second rolling bodies are accommodated in a second rolling body cage.

4. The steering column of claim 3 wherein the first and second rolling cage is at least partially of slotted configuration in the direction of the longitudinal axis.

5. The steering column of claim 1 wherein the casing tubes comprise raceways for the rolling bodies, said raceways extending in the direction of the longitudinal axis.

6. The steering column of claim 5 wherein at least one of the raceways and/or the rolling bodies are/is of cambered configuration.

7. The steering column of claim 1 wherein the casing tubes each have a polygonal cross section.

8. The steering column of claim 1 comprising two intermediate casing tubes which axially telescope relative to one another and third rolling bodies disposed between the two intermediate casing tubes, the third rolling bodies offset relative to the first rolling bodies and/or second rolling bodies.

9. The steering column of claim 1 further comprising a motorized adjustment drive connected to the inner casing tube and the outer casing tube, the drive configured to axially retract and extend the inner casing tube relative to the outer casing tube.

10. The steering column of claim 1 wherein the steering spindle is coupled to a feedback actuator.

11. A steering column for a motor vehicle, comprising:
a steering spindle;
an actuating unit, in which the steering spindle is mounted so as to be able to rotate about a longitudinal axis, the actuating unit comprising:
a casing unit which comprises casing tubes arranged so as to be axially telescopable relative to one another, and
rolling bodies arranged between the casing tubes so as to roll in the direction of the longitudinal axis,
wherein the casing tubes comprise raceways for the rolling bodies, said raceways extending in the direction of the longitudinal axis, herein at least one of the raceways and/or the rolling bodies are/is of cambered configuration.

* * * * *

UNITED STATES PATENT AND TRADEMARK OFFICE
CERTIFICATE OF CORRECTION

PATENT NO. : 11,117,610 B2
APPLICATION NO. : 16/764443
DATED : September 14, 2021
INVENTOR(S) : Tim Bayer et al.

It is certified that error appears in the above-identified patent and that said Letters Patent is hereby corrected as shown below:

On the Title Page

Item (73), should read:
(73) Assignees: THYSSENKRUPP PRESTA AG, Eschen (LI); THYSENKRUPP AG, Essen (DE)

Signed and Sealed this
Thirteenth Day of December, 2022

Katherine Kelly Vidal
*Director of the United States Patent and Trademark Office*